Patent text (abridged transcription)

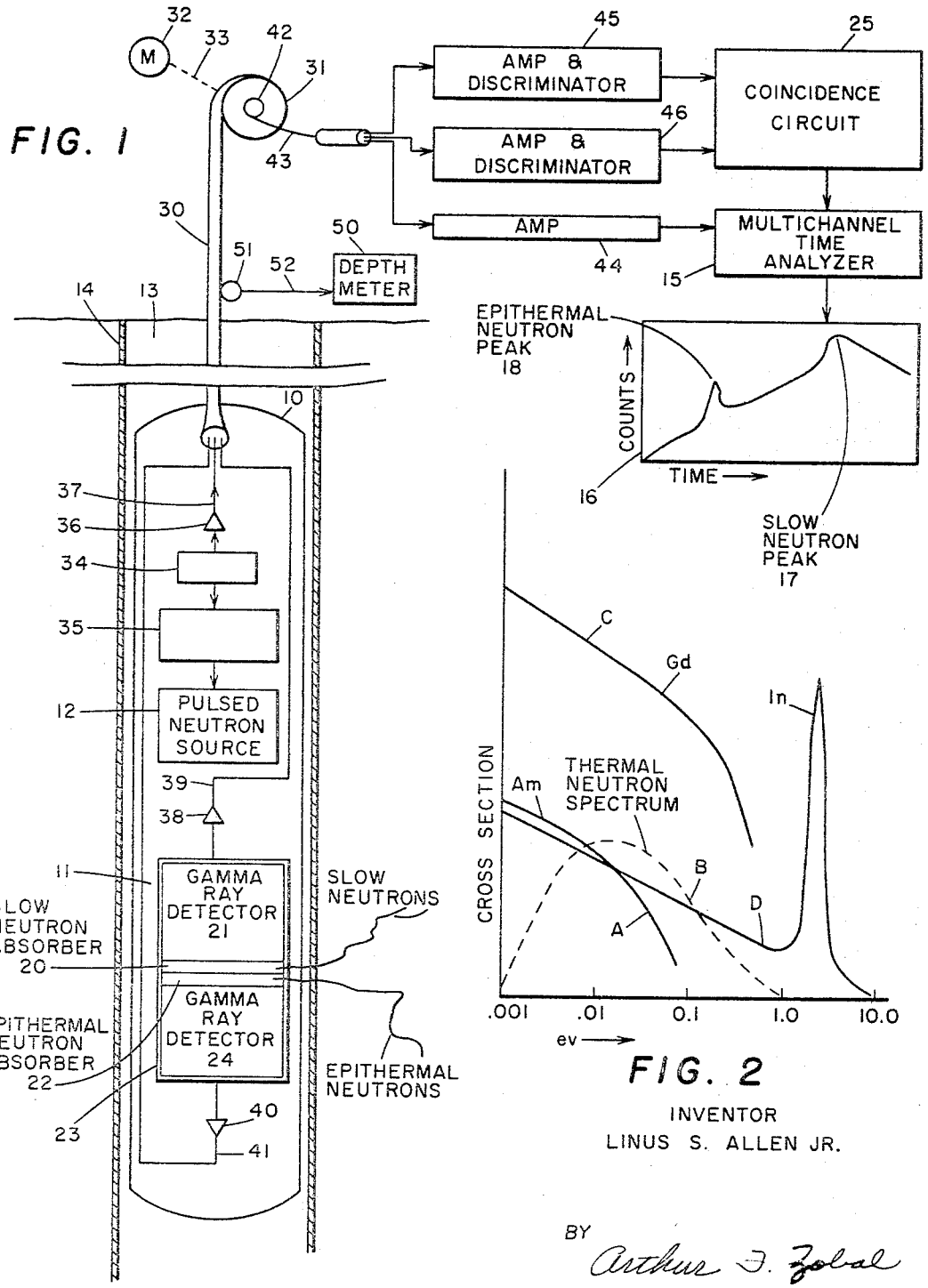

3,435,218
SLOW NEUTRON DETECTOR OF AMERICIUM-243
Linus S. Allen, Jr., Dallas, Tex., assignor to Mobil Oil Corporation, a corporation of New York
Filed June 30, 1965, Ser. No. 468,521
Int. Cl. G01t 3/02
U.S. Cl. 250—83.1      4 Claims

ABSTRACT OF THE DISCLOSURE

The specification discloses a slow neutron detector for use in pulsed neutron logging operations. The detector comprises a slow neutron absorber of americium-243 and a gamma ray detector positioned in close proximity to the absorber to detect gamma rays emitted by the absorber upon the capture of neutrons. In addition, an epithermal neutron absorber of indium is disclosed as positioned in close proximity to the gamma ray detector whereby slow neutrons and epithermal neutrons may be detected and distinguished on a time basis. In the embodiment discolsed, the two absorbers are sandwiched between two gamma ray detectors. These detectors are coupled to a common coincident circuit whereby gamma rays emitted from the absorbers may be distinguished from extraneous gamma rays.

---

This invention relates to a detector for detecting thermal neutrons and, more particularly, to a detector for borehole use for detecting low energy neutrons in the thermal neutron region as well as epithermal neutrons for use in differentiating between fresh water- and oil-bearing formations.

In well logging operations, pulsed neutron techniques are directed primarily to oil-salt water differentiation. It has been found that pulsed neutron techniques also may be applicable to oil-fresh water differentiation if very short neutron bursts are employed and measurements made of the time of occurrence of the peak intensity of the resulting slow neutrons or slow neutron-capture gamma rays. Measurements of this type are based upon the fact that neutrons generally spend more time in heavy molecules in the slowing-down process, especially at low energies below the binding energy of the hydrogen atom. Thus, the slow neutron peak intensity will appear later in time if the fluid is oil rather than fresh water. The time difference is small, however, and sensitive slow neutron measurements are required to distinguish between the two types of fluids, especially in well logging operations where many variables exist.

In accordance with the present invention, there is provided a unique detector which exhibits a high sensitivity to neutrons of very low energy and thus is particularly useful in oil-fresh water differentiation. The detector comprises a neutron absorber of americium-243 positioned in close proximity to a gamma ray detector. Neutrons are detected by detecting gamma rays emitted from the absorber upon neutron capture. Americium-243 exhibits a high sensitivity to low energy neutrons and hence, in well logging operations where time measurements are carried out, a well-defined peak representative of slow neutrons is expected.

Preferably, there is included additionally a second neutron-gamma ray reactive material having a resonance peak for reaction with neutrons of epithermal energy. This material preferably is of indium and provides an epithermal neutron peak which is employed as a porosity reference for comparison on a time basis with the slow neutron energy peak. Analysis of the time difference between the two peaks gives information about the type of fluid present in the formations.

For further objects and advantages of the present invention and for a more complete understanding thereof, reference may now be had to the following detailed description taken in conjunction with the accompanying drawings wherein:

FIGURE 1 represents the detector of the present invention as employed in a well logging system; and FIGURE 2 represents curves useful in understanding the present invention.

Referring now to FIGURE 1, the detector of the present invention is shown located in a borehole logging tool 10 and is identified at 11. The tool 10 also contains a pulsed neutron source 12 for irradiating the formations, traversed by a borehole 13 and lined with iron casing 14, with bursts of fast neutrons spaced in time. Between bursts, the detector 11 is employed for detecting slow neutrons and, in the particular embodiment disclosed, epithermal neutrons as well. The output of the detector is applied to the surface to a measuring system comprising a multichannel time analyzer 15 and readout 16 where time measurements are obtained of the peak intensity of slow neutrons and epithermal neutrons detected between neutron bursts. The peak illustrated at 17 is representative of slow neutrons while the peak 18 is representative of epithermal neutrons. Analysis of the time of occurrence of the slow neutron peak is carried out to distinguish between fresh water and oil. Porosity variaitons are measured by reference to the epithermal neutron peak.

The detector for obtaining slow neutron measurements comprises a slow neutron-gamma ray reactive absorber 20 located adjacent a gamma ray detector 21 comprising a scintillation crystal coupled to a photomultiplier tube. A separate absorber 22 is employed for obtaining epithermal neutron measurements. Neutron measurements are obtained by detecting gamma rays produced upon the interaction of neutrons with the two absorbers.

Absorber 20, for detecting slow neutrons, is of americium-243, an artificially-made, radioactive isotope. The use of americium-243, for slow neutron detection, is preferred due to its high sensitivity to low energy neutrons. These neutrons exhibit the most sensitivity to molecular weight differences, in the slowing-down process, and hence are of particular interest in oil-fresh water differentiation.

Curve A of FIGURE 2 reflects the neutron cross section of americium-243. Within the range from about 0.001 to about 0.1 electron volt, the cross section decreases rapidly with energy. The rate of decrease is more rapid than that of normal $1/v$ absorbers. Further, there is no resonance increase in cross section. Hence, preferential sensivity is expected by americium-243 to slow neutrons, as can be understood by comparison with the steady state thermal neutron energy distribution illustrated by curve B. Other materials, such as gadolinium, may exhibit cross sections of similar shape, as can be understood by reference to curve C; however, the cross section of americium-243 falls off at a much lower level. Thus, by employing americium-243, substantially increased sensitivity to slow neutrons is expected which is of particular importance in well logging operations where many variables exist which tend to affect the measurements obtained.

Although not shown, a very thin shield will be positioned around the americium-243 to absorb alpha rays emitted therefrom.

The neutron absorber 22 for detecting epithermal neutrons preferably is of indium which exhibits a high and narrow resonance peak at about 1.44 ev. for reaction with neutrons, as illustrated by curve D of FIGURE 2. As can be understood by those versed in the art, increased sensitivity to the 1.44 ev. resonance neutrons can be obtained by employing an indium absorber of appropriate thickness. In this manner, detection of the low energy neutrons by indium will be reduced substantially. The use of indium of appropriate thickness thus is expected to produce a sharply defined epithermal neutron peak which also is desirable when employed as a reference with respect to the slow neutron peak.

In order to reduce the effect of slow neutrons on indium even further, a very thin layer of boron or lithium, illustrated at 23, may be employed. Some reduction of sensitivity to slow neutrons by the absorber 20 will take place, but the effect will be slight due to the shape of the cross section curve of americium-243.

In the detection process, indium and americium each emits a cascade of gamma rays upon the capture of each neutron. Differentiation between slow and epithermal neutron-capture gamma rays is obtainable on a time basis, however, since those from epithermal neutron-capture will occur in time before those from the slow neutron capture.

In applications such as borehole logging, means such as a shield or a coincidence circuit is provided to reduce the effect of extraneous gamma rays. In the present system, a coincidence circuit arrangement is preferred since a gamma ray shield will tend to affect the time of arrival of slow and epithermal neutrons to the detector and, hence, may introduce error. The coincidence system comprises a second gamma ray detector 24 positioned adjacent the epithermal neutron absorber 22. As mentioned previously, both absorbers 20 and 22 each emits a cascade of two or more gamma rays upon the capture of a neutron. Thus, upon each neutron capture by absorber 20 or 22, there is a high probability that both detectors 21 and 24 simultaneously will detect gamma rays from the excited absorber, thereby causing the photomultiplier tube thereof to produce simultaneous electrical pulses. In the detection process, gamma rays from one absorber pass to the adjacent detector and through the other absorber to the second detector. By coupling the photomultiplier tubes and, hence, the outputs of the two detectors 21 and 24 to a common coincidence circuit, illustrated at the surface at 25, measurements can be made only of coincident gamma rays detected by detectors 21 and 24. Coincident gamma rays are expected to be predominantly from the absorber 20 or absorber 22 rather than from the formations. Thus, by selecting coincident pulses and hence coincident gamma rays, background radiation from the formations may be reduced.

A detailed description of a system employed for carrying out borehole logging operations now will be given. Referring to FIGURE 1, the borehole tool 10 is lowered into the borehole by a cable 30 wound and unwound on reel 31 driven by motor 32 and connection 33. The neutron source 12 may be a conventional D—D source actuated by an oscillator 34 and a pulse generator 35. In the production of a time spectrum by readout 16, the width of the neutron burst may be of the order of a microsecond, or less. The period between the pulses may be of the order of 2500 microseconds. The output of the oscillator 34 also is applied, by way of amplifier 36 and conductor 37, to trigger the uphole instrumentation. The outputs of the detectors 21 and 24 comprise pulses having heights related to the energy of the gamma rays detected and are applied to the surface, respectively, by way of amplifier 38 and conductor 39 and amplifier 40 and conductor 41.

At the surface, pulses are taken from conductors 37, 39, and 41 by way of suitable slip rings and brushes, illustrated at 42 and 43. Trigger pulses from oscillator 34 are amplifier at 44 and applied to analyzer 15, while pulses from detectors 21 and 24 are amplified, respectively, at 45 and 46 and applied to the coincidence circuit 25, which is coupled to the multichannel time analyzer. In the event that boron is employed as a shield 23 around the detector, circuits 45 and 46 will include single channel pulse height analyzers which are adjusted to be responsive only to pulses having heights representative of gamma rays above about 0.6 or 0.7 kev. in order to eliminate the 473 kev. gamma rays produced by boron upon the capture of thermal neutrons. A depth meter 50 coupled to the cable by way of measuring reel 51 and connection 52 is employed to obtain records in correlation with depth.

Although the measuring system shown is a system for producing a time spectrum of the slow neutron and epithermal neutron peaks, it is to be understood that a plurality of continuous trace recorders may be employed to obtain continuous traces representative of the neutrons detected at times when the slow neutron and epithermal neutron peaks are expected to occur. Instrumentations of this nature are well known to those skilled in the art.

In the embodiment described, the neutron absorbers 20 and 22 are of thin, solid sheets of suitable dimensions. If it is desired to detect only slow neutrons, absorber 22 will be omitted. The gamma ray detectors 21 and 24 may comprise conventional sodium-iodide scintillation crystals coupled to Dumont 6292 phototubes. Although not shown, a suitable shield will be employed between source 12 and detector 11. A suitable coincidence circuit 25 may be of the type manufactured by Hamner Electronics Company, Inc., Princeton, N.J., Model No. 681. The neutron generator 12 may be a suitable neutron tube fitted for beam sweeping or containing an ion suppressor grid to reduce the fast neutron burst length. The pulse height analyzers of circuits 45 and 46 may be of the type manufactured by Hamner Electronics Company, Inc., Model N-603. The multichannel time analyzer 15 may be the type manufactured by the Technical Measurement Corp., New Haven, Conn., Model CN-110, including a plug-in Model 211, Time-Of-Flight Logic Circuit. A conventional $x-y$ plotter or oscilloscope may be employed for readout 16.

Having described the invention, it will be understood that modifications will suggest themselves to those skilled in the art, and it is intended to cover all those that fall within the scope of the appended claims.

What is claimed is:

1. A detector for detecting epithermal neutrons and slow neutrons comprising:
    a first neutron-gamma ray reactive material having a resonance peak for reaction with neutrons of epithermal energy,
    a second neutron-gamma ray reactive material of americium-243, and
    two gamma ray detecting means positioned to detect gamma rays emitted from said first and second materials upon the capture of neutrons,
    said first and second neutron-gamma ray reactive materials being located adjacent to each other and between said two gamma ray detecting means,
    said materials and detecting means forming a separate and distinct unit for use in investigating substances without physical contact therewith.

2. The detector of claim 1 including:
    a common coincident circuit coupled to each of said gamma ray detecting means.

3. In a pulsed neutron well logging system including a logging tool containing a pulsed neutron source for irradiating the formations traversed by a borehole with bursts of fast neutrons spaced in time, the combination therewith of:
    a detector located in said tool for detecting slow neutrons from the formations,
    said detector comprising a first neutron-gamma ray reactive material of americium-243,
    a second neutron-gamma ray reactive material having a resonance peak for rection with neutrons of epithermal energy, two gamma ray detecting means postioned to detect gamma rays emitted from said first and second materials upon the capture of neutrons, said first and second neutron-gamma ray reactive materials being located adjacent to each other and between said two gamma ray detecting means, a common coincident circuit coupled to each of said gamma ray detecting means, and means coupled to said coincident circuit for recording the output thereof.

4. In a pulsed neutron well logging system including a logging tool containing a pulsed neutron source for irradiating the formations traversed by a morehole with bursts of fast neutrons spaced in time, the combination therewith of:

a detector located in said tool for detecting slow neutrons and epithermal neutrons from the formations, said detector comprising a first neutron-gamma ray reactive material having a resonance peak for reaction with neutrons of epithermal energy, a second neutron-gamma ray reactive material of americium-243, two gamma ray detecting means positioned to detect gamma rays emitted by said first and second neutron-gamma ray reactive materials upon the capture of neutrons, said first and second neutron-gamma ray reactive materials being located adjacent to each other and at a position between said two gamma ray detecting means, at said position, each neutron-gamma ray reactive material being located between one of said gamma ray detecting means and the other of said neutron-gamma ray reactive materials, a common coincident circuit coupled to each of said gamma ray detecting means, said circuit producing an output respresentative of neutrons detected, and means for recording said output for the production of measurements representative of the quantity of slow neutrons and epithermal neutrons detected as a function of time between said neutron bursts.

References Cited

UNITED STATES PATENTS

| | | | |
|---|---|---|---|
| 2,476,810 | 7/1949 | Brunner et al. | 250—43.5 X |
| 2,491,320 | 12/1949 | Koontz | 250—83.1 X |
| 2,740,898 | 4/1956 | Youmans | 250—71.5 |
| 2,769,915 | 11/1956 | Tittle | 250—71.5 |
| 2,769,916 | 11/1956 | Tittle | 250—71.5 |
| 2,920,204 | 1/1960 | Youmans. | |
| 2,991,364 | 7/1961 | Goodman. | |

OTHER REFERENCES

The Time Scale of Neutron Slowing Down in Water, E. Moller and N. G. Sjostrand, Nuclear Science and Engineering, vol. 15, No. 2, February 1963, pp. 221–222.

RALPH G. NILSON, *Primary Examiner.*

SAUL ELBAUM, *Assistant Examiner.*

U.S. Cl. X. R.

250—71.5